UNITED STATES PATENT OFFICE.

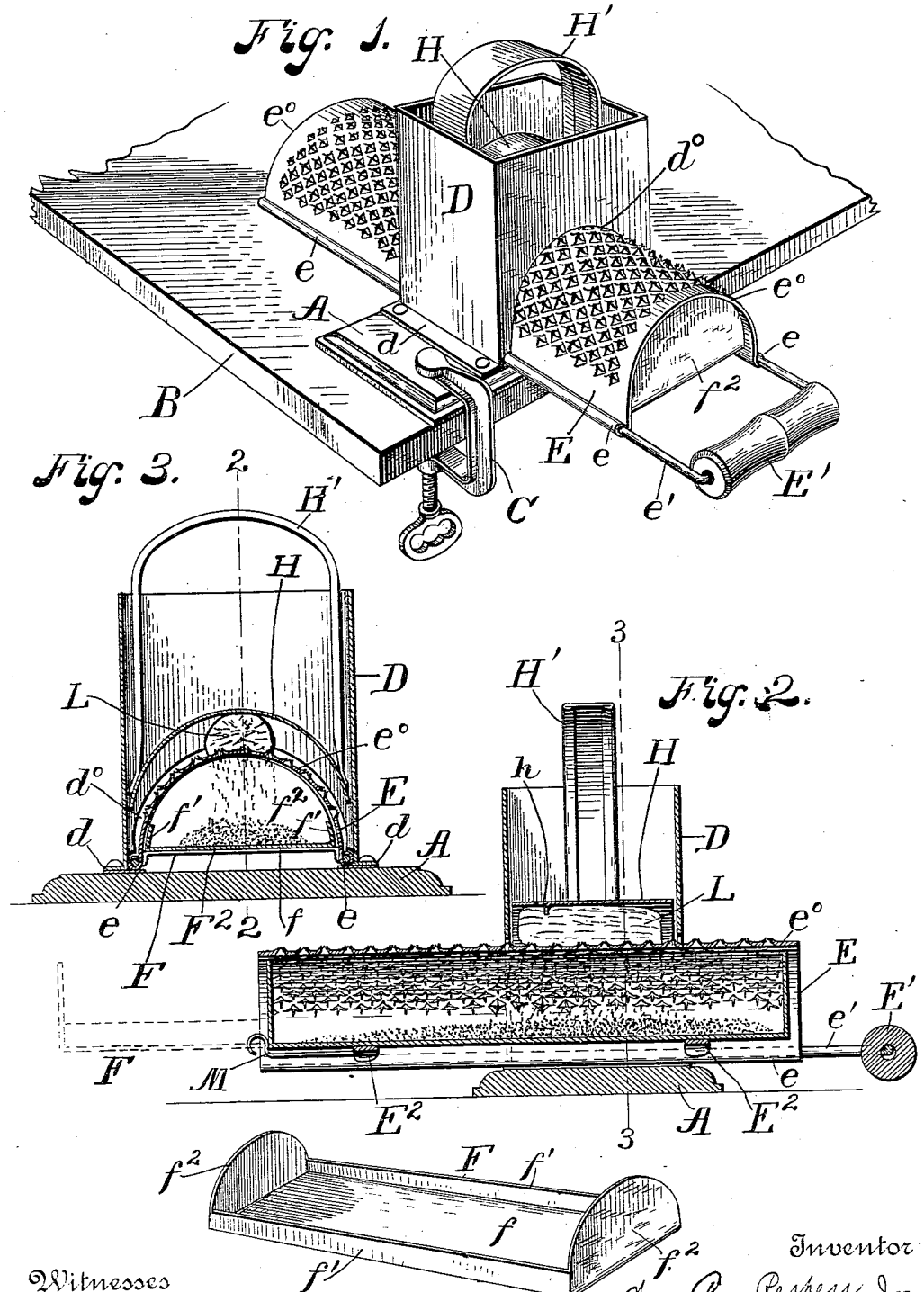

WILLIAM RICHARD RESPESS, JR., OF NEW ORLEANS, LOUISIANA, ASSIGNOR TO WILLIAM H. BOFINGER, OF SAME PLACE.

MACHINE FOR GRATING FRUITS, &c.

SPECIFICATION forming part of Letters Patent No. 555,124, dated February 25, 1896.

Application filed June 11, 1895. Serial No. 552,479. (No model.)

*To all whom it may concern:*

Be it known that I, WILLIAM RICHARD RESPESS, Jr., a citizen of the United States, residing at New Orleans, in the parish of Orleans and State of Louisiana, have invented new and useful Improvements in Machines for Grating Fruits, Vegetables, Meats, &c., of which the following is a specification.

My invention relates to improvements in fruit or vegetable graters; and it consists of certain novel features hereinafter described and claimed.

Reference is had to the accompanying drawings, in which the same parts are indicated by the same letters throughout the several views.

Figure 1 represents a perspective view of my improved grater clamped to a table and ready for use. Fig. 2 represents a section along the line 2 2 of Fig. 3 and looking to the right. Fig. 3 represents a section along the line 3 3 of Fig. 2 and looking to the left, and Fig. 4 represents the detachable trough carried by the grater and adapted to receive the matter grated.

A represents a suitable platform, preferably of wood, which is clamped to the table B by means of one or two of the clamps C, or it may be secured thereto in any convenient way.

D represents a rectangular metallic box open at the top and flanged at the bottom, as at $d$, and secured to the said platform A. The two ends of this box D are cut away, as indicated at $d^0$, to admit the passage therethrough of the grater E. This grater is made semi-cylindrical or arch-shaped, as indicated at $e^0$, and has the side beads $e$, into which passes the wire $e'$ carrying the revoluble handle E'.

Across the bottom of the grater and spanning the same are two or more stay-pieces $E^2$, which not only serve to prevent the grater from spreading, but also serve as a support for the receiving-trough F, which will now be described. This trough F has a flat bottom $f$, adapted to rest on the stay-pieces $E^2$, with shallow vertical sides $f'$ and arch-shaped ends $f^2$. This trough is made to fit snug enough in the interior of the grater so as not to be readily detached therefrom; but it may be held in position by a spring-clip. (Indicated at M in Fig. 2.) This trough moves with the grater, and is slid out when ready for emptying, as indicated by lines at F in Fig. 2.

The vegetable or fruit to be grated is indicated by L, which is held beneath the curved plate H attached to the handle H' projecting out of the top of the box D. This curved plate H has one or more inwardly-projecting teeth $h$, stamped out of the metal and adapted to hold the object being grated in position relative to the plate H.

By an inspection of Fig. 2 it will be seen that the particles grated off by the reciprocating motion of the grater will fall into the trough F, which trough is removed and emptied whenever desired.

It will be obvious that various modifications of the herein-described apparatus might be made which could be used without departing from the spirit of my invention.

Having thus described my invention, what I claim, and desire to secure by Letters Patent of the United States, is—

1. In an apparatus for grating vegetables, fruit and the like, the combination with a platform of a box secured on said platform and having the ends thereof cut away to admit the passage of the grater, of a grater passing through the cut-away ends of said box, a detachable receiving-trough mounted in said grater, and means for holding the material to be grated down upon said grater, substantially as described.

2. In an apparatus for grating vegetables, fruit and the like, the combination with a platform, of a box secured on said platform and having the ends cut away to admit the passage of the grater, of a grater having a curved grating-surface passing through the cut-away ends of said box, a detachable receiving-trough mounted in said grater, and a curved plate with a handle thereon and teeth projecting downward therefrom for holding the material to be grated down upon said grater, substantially as described.

In testimony whereof I affix my signature in the presence of two witnesses.

WM. RICHARD RESPESS, JR.

Witnesses:
W. H. BOFINGER,
JOHN J. SAUCIER.